United States Patent
Rader et al.

(10) Patent No.: US 6,280,490 B1
(45) Date of Patent: Aug. 28, 2001

(54) POLISHING COMPOSITION AND METHOD FOR PRODUCING A MEMORY HARD DISK

(75) Inventors: W. Scott Rader; David M. Shemo; Toshiki Owaki, all of Tualatin, OR (US)

(73) Assignee: Fujimi America Inc., Wilsonville, OR (US)

( * ) Notice: Subject to any disclaimer, the term of this patent is extended or adjusted under 35 U.S.C. 154(b) by 0 days.

(21) Appl. No.: 09/405,222

(22) Filed: Sep. 27, 1999

(51) Int. Cl.[7] .............................. C09K 3/14; C09G 1/02; B24B 1/00
(52) U.S. Cl. ............................. 51/309; 51/307; 51/308; 106/3; 451/28; 510/165; 510/167
(58) Field of Search .............................. 51/307, 308, 309; 106/3; 451/28; 216/89, 53; 438/692, 693; 510/165, 175, 397, 167

(56) References Cited

U.S. PATENT DOCUMENTS

| | | |
|---|---|---|
| 5,575,837 | 11/1996 | Kodama et al. . |
| 5,733,819 * | 3/1998 | Kodama et al. .................. 106/3 |
| 5,858,813 * | 1/1999 | Scherber et al. ................ 438/693 |
| 5,959,288 | 9/1999 | Mueller et al. . |
| 5,980,775 | 11/1999 | Grumbine et al. . |
| 5,997,620 * | 12/1999 | Kodama et al. ................ 51/307 |
| 6,015,506 * | 1/2000 | Streinz et al. ................ 510/175 |
| 6,015,813 | 1/2000 | Jeppesen et al. . |
| 6,068,787 * | 5/2000 | Grumbine et al. .............. 438/692 |
| 6,083,419 * | 7/2000 | Grumbine et al. .............. 438/692 |

FOREIGN PATENT DOCUMENTS 0 844 290 A1   5/1998   (EP) .

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A polishing composition for a memory hard disk, which comprises the following components (a) to (d):

(a) from 0.1 to 50 wt %, based on the total amount of the polishing composition, of at least one abrasive selected from the group consisting of silicon dioxide, aluminum oxide, cerium oxide, zirconium oxide, titanium oxide, silicon nitride and manganese dioxide, (b) from 0.001 to 10 wt %, based on the total amount of the polishing composition, of at least one iron salt selected from the group consisting of iron nitrate, iron sulfate, ammonium iron sulfate, iron perchlorate, iron chloride, iron citrate, ammonium iron titrate, iron oxalate, ammonium iron oxalate and an iron chelate complex salt of ethylenediaminetetraacetic acid, (c) from 0.01 to 30 wt %, based on the total amount of the polishing composition, of at least one peroxydisulfate salt selected from the group consisting of ammonium peroxydisulfate, potassium peroxydisulfate and sodium peroxydisulfate, and (d) water.

8 Claims, No Drawings

POLISHING COMPOSITION AND METHOD FOR PRODUCING A MEMORY HARD DISK

BACKGROUND OF THE INVENTION

1. Field of the Invention

The present invention relates to a polishing composition useful for final polishing of the surface of a magnetic disk substrate in the preparation of a substrate for a magnetic disk to be used for a memory hard disk, i.e. a memory device useful for e.g. a computer. More particularly, the present invention relates to a polishing composition to be used for the preparation of a memory hard disk represented by e.g. a Ni—P disk, a Ni—Fe disk, an aluminum disk, a boron carbide disk or a carbon disk, particularly a polishing composition which provides a high stock removal rate in a polishing process for finishing a highly specular surface with a good surface roughness and which, at the same time, is applicable to a production technique for obtaining an excellent finished surface which is useful for a magnetic disk device having a large capacity and a high recording density. Further, the present invention relates to a method for polishing a memory hard disk employing such a polishing composition.

2. Discussion of Background

There have been continuing efforts for miniaturization and larger capacity for memory hard disks to be used for magnetic disk devices which are one of memory media for e.g. computers, and magnetic media are being changed from conventional coating type media to thin film media prepared by sputtering, plating or other methods.

A disk substrate (hereinafter referred to simply as "a substrate") which is most widely used at present, is one having an electroless Ni—P plating film formed on a blank material. Here, the blank material is one obtained by fairing an aluminum or other base plate by lathe processing by diamond turning, lapping by means of a PVA grindstone prepared by fixing SiC grinding material or other methods, for the purpose of parallelization or planarization. However, by such various fairing methods, a relatively large waviness can not completely be removed. And, the electroless Ni—P plating film will be formed along the waviness on the blank material. Accordingly, such a waviness will remain also on the substrate, and nodules or large pits will sometimes be formed. Here, the "nodules" are bulges having a diameter of at least about 50 $\mu$m, which are formed by bulging of a plating surface at such portions that impurities have been taken into the Ni—P plating film. The "pits" are dents formed by polishing on the surface of the substrate, and "fine pits" are dents having a diameter of less than about 10 $\mu$m, among them.

On the other hand, along with the increase in the capacity of memory hard disks, the surface recording density is increasing at a rate of a few tens % per year. Accordingly, the space on a memory hard disk occupied by a predetermined amount of recorded information, is narrower than ever, and the magnetic force required for recording tends to be weak. Accordingly, for recent magnetic disk devices, it is required to minimize the flying height of the head, which is a space between the magnetic head and the memory hard disk, and at present, the flying height of the head is reduced to a level of not higher than 1.0 $\mu$inch (about 0.025 $\mu$m).

Further, so-called texturing may sometimes be carried out to impart concentric circular scorelines to the substrate after polishing for the purposes of preventing sticking of the magnetic head for reading or writing information, to the memory hard disk and preventing non-uniformity of the magnetic field on the memory hard disk due to scorelines in a certain direction different from the rotational direction of the memory hard disk, formed on the substrate surface by polishing. Recently, for the purpose of further reducing the flying height of the head, light texturing is carried out wherein the scorelines formed on the substrate are further reduced, or a non-texture substrate free from scorelines, is employed which is not subjected to texturing. The technology to support such a low flying height of the magnetic head has also been developed, and the reduction of the flying height of the head is being increasingly advanced.

When a memory hard disk surface has a waviness, the head moves up and down following the waviness of the memory hard disk which is rotated at a very high speed. However, if the waviness exceeds a certain height, or if the width of waviness is small relative to the height, the head will no longer be able to follow the waviness, and the head will collide against the substrate surface, thus resulting in so-called "head crush", whereby the magnetic head or the magnetic medium on the memory hard disk surface may be damaged, which may cause a trouble to the magnetic disk device, or which may cause an error in reading or writing information.

On the other hand, head crush may occur also when a micro protrusion of a few $\mu$m is present on the memory hard disk surface. Further, when a pit is present on a memory hard disk, it is likely that information can not completely be written in, thus leading to a defect of information so-called a "bit defect" or failure in reading the information, which causes an error.

Accordingly, it is important to minimize the surface roughness of the substrate in the polishing step i.e. the step prior to forming a magnetic medium, and at the same time, it is necessary to completely remove a relatively large waviness as well as micro protrusions, fine pits and other surface defects.

For the above purpose, it used to be common to carry out finishing by one polishing step by means of a polishing composition (hereinafter sometimes referred to as a "slurry" from its nature) comprising aluminum oxide or other various abrasives and water as well as various polishing accelerators. However, by a single polishing step, it has been difficult to satisfy all of the requirements for removing a relatively large waviness as well as surface defects such as nodules and large pits on the substrate surface and for minimizing the surface roughness within a certain period of time. Accordingly, a polishing process comprising two or more steps, has been studied.

In a case where the polishing process comprises two steps, the main purpose of the polishing in the first step will be to remove a relatively large waviness as well as surface defects such as nodules and large pits on the substrate surface, i.e. fairing. Accordingly, a polishing composition is required which has a high ability of correcting the above-mentioned waviness and surface defects without forming deep scratches which can not be removed by polishing in the second step, rather than minimizing the surface roughness.

The purpose of polishing in the second step i.e. finishing or final polishing, is to minimize the surface roughness of the substrate. Accordingly, it is important that the polishing composition is capable of minimizing the surface roughness and capable of preventing formation of micro protrusions, fine pits or other surface defects rather than it has a high ability for correcting a large waviness or surface defects as required for polishing in the first step. Further, from the viewpoint of the productivity, it is also important that the stock removal rate is high. The degree of the surface roughness is determined depending upon the process for producing the substrate, the final recording capacity as a memory hard disk and other conditions. However, depending upon the desired degree of surface roughness, a polishing process comprising more than two steps, may be employed.

Further, recently, an improvement has been made in processing a blank material by means of a PVA grinder in order to reduce the processing cost, whereby it is intended to reduce the surface roughness of a blank material prior to the use of the main polishing composition so the quality relating to the surface roughness or waviness of the plated substrate prior to the polishing, is brought to a level after the conventional first polishing step. If such a processing is carried out, the conventional first polishing step will be unnecessary, and only so-called finishing polishing will be required.

For the above purpose, particularly in finishing polishing, it has been common to carry out polishing by means of a polishing composition prepared in such a manner that aluminum oxide or other abrasive is thoroughly pulverized and adjusted to a proper particle size, water is added thereto, and aluminum nitrate or various organic acids and other polishing accelerators are incorporated thereto, or a polishing composition comprising colloidal silica and water. However, the polishing by means of the former polishing composition had a problem that the balance between the mechanical component and the chemical component was poor, and micro protrusions or fine pits tended to form. The polishing by means of the latter polishing composition had a problem such that the stock removal rate was so low that it took a long time for polishing, and the productivity was low, roll off (or "dub off") as an index of sagging of an end face of the substrate tended to deteriorate, or washing after the polishing tended to be difficult.

To solve such a problem, JP-A-10-204416 proposes a polishing composition comprising an abrasive and an iron compound. The polishing composition disclosed in this publication is intended to solve the above-mentioned problem, and it has a high stock removal rate and is capable of providing a polished surface having a small surface roughness. However, from a further study by the present inventors, it has been found that in order to secure a high polishing efficiency by means of the disclosed polishing composition, a large amount of an iron compound, particularly iron(III) nitrate or iron(III) sulfate, is required. Here, there is a problem that the pH of the composition tends to be as low as less than 2.0.

SUMMARY OF THE INVENTION

It is an object of the present invention to solve the above-mentioned problems, and to provide a polishing composition which has a high stock removal rate and is capable of preventing formation of microprotrusions, fine pits and other surface defects, as heretofore required for a polishing composition and which further makes it possible to attain a high stock removal rate even at a pH greater than 2.0.

The present invention provides a polishing composition for a memory hard disk, which comprises the following components (a) to (d):

(a) from 0.1 to 50 wt %, based on the total amount of the polishing composition, of at least one abrasive selected from the group consisting of silicon dioxide, aluminum oxide, cerium oxide, zirconium oxide, titanium oxide, silicon nitride and manganese dioxide, (b) from 0.001 to 10 wt %, based on the total amount of the polishing composition, of at least one iron salt selected from the group consisting of iron nitrate, iron sulfate, ammonium iron sulfate, iron perchlorate, iron chloride, iron citrate, ammonium iron citrate, iron oxalate, ammonium iron oxalate and an iron chelate complex salt of ethylenediaminetetraacetic acid, (c) from 0.01 to 30 wt %, based on the total amount of the polishing composition, of at least one peroxydisulfate salt selected from the group consisting of ammonium peroxydisulfate, potassium peroxydisulfate and sodium peroxydisulfate, and (d) water.

Further, the present invention provides a method for producing a memory hard disk, which comprises polishing a substrate for a memory hard disk by means of a polishing composition for a memory hard disk, which comprises the following components (a) to (d):

(a) from 0.1 to 50 wt %, based on the total amount of the polishing composition, of at least one abrasive selected from the group consisting of silicon dioxide, aluminum oxide, cerium oxide, zirconium oxide, titanium oxide, silicon nitride and manganese dioxide, (b) from 0.001 to 10 wt %, based on the total amount of the polishing composition, of at least one iron salt selected from the group consisting of iron nitrate, iron sulfate, ammonium iron sulfate, iron perchlorate, iron chloride, iron citrate, ammonium iron citrate, iron oxalate, ammonium iron oxalate and an iron chelate complex salt of ethylenediaminetetraacetic acid, (c) from 0.01 to 30 wt %, based on the total amount of the polishing composition, of at least one peroxydisulfate salt selected from the group consisting of ammonium peroxydisulfate, potassium peroxydisulfate and sodium peroxydisulfate, and (d) water.

The polishing composition for a memory hard disk of the present invention has a high stock removal rate and is capable of providing a polished surface having a small surface roughness and further capable of preventing formation of microprotrusions, fine pits or other surface defects, and it also makes it possible to obtain a high stock removal rate even at a pH greater than 2.0.

Further, according to the method for producing a memory hard disk of the present invention, the stock removal rate is high, and it is possible to obtain a memory hard disk with small surface roughness and little microprotrusions, fine pits or other surface defects.

DETAILED DESCRIPTION OF THE PREFERRED EMBODIMENTS

Abrasive

The abrasive which is suitable for use as the main abrasive among the components of the polishing composition of the present invention, is selected from the group consisting of silicon dioxide, aluminum oxide, cerium oxide, titanium oxide, silicon nitride, zirconium oxide and manganese dioxide. The abrasive is not limited to any particular one of these, but is preferably silicon dioxide. Silicon dioxide includes colloidal silica, fumed silica and many other types which are different in the methods for their production or in their properties.

Also, aluminum oxide includes α-alumina, δ-alumina, θ-alumina, κ-alumina and other morphologically different substances. Further, it includes one called fumed alumina from the method for its production.

Cerium oxide includes trivalent and tetravalent ones from the oxidation numbers, and it includes hexagonal system, isometric system and face-centered cubic system ones from the crystal systems.

Zirconium oxide includes monoclinic system, tetragonal system and amorphous ones from the crystal systems. Further, it includes one called fumed zirconia from the method for its production.

Titanium oxide includes titanium monoxide, dititanium trioxide, titanium dioxide and others from the crystal systems. Further, it includes one called fumed titania from the method for its production.

Silicon nitride includes α-silicon nitride, β-silicon nitride, amorphous silicon nitride and other morphologically different silicon nitrides.

Manganese dioxide includes, α-manganese dioxide, β-manganese dioxide, γ-manganese dioxide, δ-manganese dioxide, ε-manganese dioxide, η-manganese dioxide and others from its morphology.

For the composition of the present invention, these abrasives may be employed in optional combination as the case requires. When they are used in combination, the manner of the combination, and the proportions of the respective abrasives are not particularly limited.

Among these abrasives, colloidal silica, is preferred to be used as the abrasive of the present invention. As a method for producing colloidal silica, it is common to employ a method wherein sodium silicate or potassium silicate is ion-exchanged to obtain ultrafine colloidal silica which is then subjected to grain growth, a method wherein an alkoxysilane is hydrolyzed with an acid or alkali, or a method wherein an organic silicon compound is heated and decomposed in a wet system.

The above abrasive is to polish a surface to be polished by a mechanical action as abrasive grains. Among them, the particle size of silicon dioxide is usually from 0.005 to 0.6 μm, preferably from 0.01 to 0.2 μm, as the average particle size obtained by conversion of a surface area measurement employing a BET method. Likewise, the particle sizes of aluminum oxide, zirconium oxide, titanium oxide and silicon nitride are usually from 0.01 to 1 μm, preferably from 0.05 to 0.3 μm, as the average particle sizes measured by a laser diffraction particle size distribution measuring apparatus. Further, the particle sizes of cerium oxide and manganese dioxide are usually from 0.01 to 1 μm, preferably from 0.05 to 0.3 μm, as the average particle sizes observed by a scanning electron microscope.

If the average particle sizes of these abrasives exceed the above-mentioned ranges, the surface roughness of the polished surface tends to be bad, or scratching is likely to result. On the other hand, if they are less than the above-mentioned ranges, the stock removal rate tends to be very low and impractical.

The content of the abrasive in the polishing composition varies depending upon the type of the abrasive to be used. When the abrasive is silicon dioxide or aluminum oxide, it is usually from 0.1 to 40 wt % preferably from 1.0 to 15 wt %, based on the total amount of the composition. When the abrasive is titanium oxide, silicon nitride or manganese dioxide, it is usually from 0.1 to 30 wt %, preferably from 0.5 to 15 wt %. When the abrasive is cerium oxide or zirconium oxide, it is usually from 0.5 to 50 wt %, preferably from 1 to 25 wt %. If the content of the abrasive is too small, the stock removal rate tends to be low, and if it is too large, uniform dispersion can not be maintained, and the viscosity of the composition tends to be so high that the handling will be difficult.

Accelerator

Further, the polishing composition of the present invention is characterized in that it contains an iron salt as a polishing accelerator. The valency of the iron salt to be bivalent or trivalent. Namely, even if a bivalent iron salt is used, it will be converted to a trivalent iron salt by the action of a peroxydisulfate salt which is simultaneously incorporated, whereupon the trivalent iron salt will serve as a practical polishing accelerator, and the final results will be substantially the same as an addition of a trivalent iron salt.

The content of the iron salt in the polishing composition of the present invention varies depending upon the effect of the particular compound. However, it is usually from 0.001 to 10 wt %, preferably from 0.01 to 5 wt %, more preferably from 0.1 to 5 wt %, based on the total amount of the polishing composition. If the amount of the iron salt is small, the chemical effect of the peroxydisulfate salt in the polishing composition will not efficiently be obtained, whereby the polishing performance tends to be low, such being uneconomical. On the other hand, if it is too large, the degree of improvement tends to be low, and there may be an economical demerit. Further, especially when the pH becomes less than 2.0, the polishing composition may present irritation to the skin of the user or may bring about corrosion to the polishing machine, whereby a due care will be required for its handling.

Acceleration Assistant

Further, the polishing composition of the present invention is characterized in that it contains a peroxydisulfate salt. This peroxydisulfate salt is believed to promote the polishing acceleration effect by a chemical action of the iron salt, as a polishing acceleration assistant, and it also has an action to oxidize a bivalent iron salt to a trivalent iron salt, when the iron salt is added in a bivalent state. The amount of the peroxydisulfate salt to be added may vary depending upon the amount of the above iron salt, but it is usually from 0.01 to 30 wt %, preferably from 0.1 to 10 wt %, based on the total amount of the polishing composition. If the amount is small, the polishing efficiency tends to be low, such being uneconomical. On the other hand, if it is too large, the degree for improvement tends to be small, whereby an economical demerit is likely to result. Not only that, oxygen will be formed by the decomposition of an excessive peroxydisulfate salt during the storage, whereby the pressure in the container during the storage tends to be excessive, and in an extreme case, the container will break or present a potentially hazardous situation. Accordingly, a due care is required.

Buffer Content

Furthermore, the polishing composition of the present invention is characterized in that it may contain a buffer component, as the case requires. This buffer component is determined depending upon the type of the anion of the above polishing acceleration assistant. In a case where the polishing acceleration assistant is a peroxodisulfate, the buffer component is preferably a sulfate, such as potassium sulfate, sodium sulfate or ammonium sulfate. When the buffer component is added, the pH of the composition will be stabilized, whereby the storage stability of the entire polishing composition will be improved. A preferred amount of the buffer component is determined depending upon the above polishing acceleration assistant, and it is usually from 0 to 200 anion mol %, preferably from 80 to 120 mol %, relative to the anion of the polishing acceleration assistant. Most preferably, it is equimolar to the polishing acceleration assistant's anion (i.e. 100 mol % to the anion in the polishing acceleration assistant).

Polishing Composition

Further, the polishing composition of the present invention may be prepared and stored or transported in the form of a stock solution having a relatively high concentration, and may be used by diluting it at the time of the actual polishing treatment. The above-mentioned preferred ranges of concentration are concentrations at the time of actual polishing treatment. Needless to say, when such a method of use is employed, the polishing composition will be a solution having a higher concentration in the state in which it is stored or transported. Further, from the viewpoint of the handling efficiency, it is preferred that the polishing composition is prepared in such a concentrated form.

Further, in order to prevent decomposition of the peroxydisulfate salt during storage of the polishing composition of the present invention, the polishing composition may be stored as divided into two or more compositions. Specifically, only the abrasive and the iron salt may be prepared and stored in the form of a stock liquid having a high concentration, so that the peroxydisulfate salt, or the peroxydisulfate salt and the buffer component, or a mixture of the two, may be dissolved when the stock solution is diluted immediately before the polishing operation. Otherwise, the iron salt, the peroxydisulfate salt and the buffer component may be stored as mixed in a powder form in the predetermined ratio, so that this mixture and the abrasive may be dispersed/dissolved in water as the case requires, immediately before the polishing operation. By employing such a method, the storage may be made in a relatively high concentration.

At the time of preparing the above polishing composition, various known additives may further be added for the purposes of stabilizing or maintaining the quality of the product, or depending upon the type of the object to be treated, the polishing conditions or the necessity for other processing conditions. Preferred examples of such additives include (a) cellulose, carboxymethylcellulose and hydroxyethylcellulose, and other celluloses, (b) ethanol, propanol and ethylene glycol, and other water-soluble alcohols, (c) a sodium alkylbenzenesulfonate and a formalin condensate of naphthalenesulfonic acid, and other surfactants, (d) a lignin sulfonate and a polyacrylate, and other organic polyanionic substances, (e) a polyvinyl alcohol, and other water-soluble polymers (emulsifiers), and (f) sodium arginate, potassium hydrogencarbonate, and other bactericides.

The detailed mechanism is not clearly understood with respect to the reason why the polishing composition of the present invention has a high stock removal rate in polishing a substrate and is capable of providing a polished surface having a small surface roughness with little microprotrusions, fine pits or other surface defects. However, it may be explained as follows taking a Ni—P plated substrate as an example.

With respect to the reason for the high speed in polishing the Ni—P plating, it is considered that the Ni—P plated surface is oxidized by the reaction for the conversion of trivalent iron ions to bivalent iron ions, and the Ni—P plated surface thereby made brittle, will be readily removed by the mechanical action of the abrasive. Further, the peroxydisulfate salt present in the slurry will oxidize iron ions converted to a bivalent state to convert them again to a trivalent state, whereby the maximum effects can be obtained even with a relatively low concentration of iron ions. It is considered that on the other hand, the peroxydisulfate salt will bring about a proper oxidizing action to the Ni—P plated surface, so that the surface roughness will be small, and microprotrusions, fine pits or other surface defects will be little.

Preparation of a Memory Hard Disk

The method for preparing a memory hard disk according to the present invention, comprises polishing a memory hard disk by means of the above-described polishing composition.

The substrate of the memory hard disk to be polished may, for example, be a Ni—P disk, a Ni—Fe disk, an aluminum disk, a boron carbide disk, a carbon disk or the like. Among them, it is preferred to employ a Ni—P disk or an aluminum disk.

The method for preparing a memory hard disk of the present invention may employ any conventional polishing method for a memory hard disk or any combination of polishing conditions, so long as the above-described polishing composition is used.

For example, as the polishing machine, a single side polishing machine, a double side polishing machine or other machines may be employed. Further, the polishing pad may be of a suede type, a non-woven type, a flocked type, a raising type or the like.

Further, the polishing composition used in the method for preparing a memory hard disk of the present invention has a high stock removal rate and at the same time provides a flat polished surface. Accordingly, the polishing process can be carried out in one step, or can be carried out in two or more steps under different polishing conditions. In a case where the polishing process is carried out in two or more steps, it is preferred that the polishing step employing the above-described polishing composition will be the final polishing step, i.e. a preliminarily polished substrate will be polished by means of the above-described polishing composition. Further, to carry out the polishing by the polishing composition of the present invention more efficiently, it is advisable to adjust the surface roughness of the preliminarily polished substrate to be Ra=at most 30 Å as measured by a contact surface roughness meter.

Now, the polishing composition of the present invention will be described in further detail with reference to Examples. However, it should be understood that the present invention is by no means restricted to such specific Examples.

Preparation of Polishing Compositions

Firstly, the iron salt, peroxydisulfate acid and buffer were completely dissolved in water, then colloidal silica (primary particle size: 35 nm, and predispersed) was added as identified in Table 1 and mixed to obtain test samples of Examples 1 to 29 and Comparative Examples 1 to 13.

Polishing Test

Then, using the above polishing composition and a substrate preliminarily polished by DISKLITE-1312 (manufactured by Fujimi Incorporated), a polishing test was carried out. The polishing conditions were as follows.

Polishing Conditions

Polishing machine: Double side polishing machine

Object to be polished: 3.5" electroless Ni—P substrate (already polished in the first step; surface roughness Ra=16 Å)

Number of sheets polished: 2 sheets/1 carrier×5 carriers×2 tests=20 sheets

Polishing pad: Politex DPC 5350 (manufactured by Rodel Inc., U.S.A.)

Treating pressure: 60 g/cm$^2$

Platen rotational speed: 40 rpm

Supply rate of the polishing composition: 100 cc/min

Polishing time: 12 minutes

After the polishing, the substrate was sequentially cleaned and dried, and then, the weight reduction of the substrate by the polishing was measured. The measurement was carried out with respect to all of the 20 sheets polished, and the stock removal rate was obtained from the average. The obtained results were as shown in Table 1.

| Example Nos. | Working Slurry Composition (1 Liter Slurry) | | | | | Results | | Buffer Solution |
|---|---|---|---|---|---|---|---|---|
| | Colloidal Silica wt % | Iron Salt | g/lit | Oxidizer | g/lit | Stock Removal Rate um/min | pH | |
| Example 1 | 6.7 | A | 3.7 | $Na_2S_2O_8$ | 10.0 | 0.25 | 2.4 | |
| Example 2 | 7.1 | A | 3.7 | $Na_2S_2O_8$ | 15.7 | 0.25 | 2.6 | |
| Example 3 | 6.7 | A | 3.7 | $Na_2S_2O_8$ | 20.0 | 0.27 | 2.5 | |
| Example 4 | 7.1 | A | 3.0 | $(NH_4)_2S_2O_8$ | 10.0 | 0.22 | 2.4 | |
| Example 5 | 7.1 | A | 3.7 | $(NH_4)_2S_2O_8$ | 6.7 | 0.21 | 2.5 | |
| Example 6 | 7.1 | A | 3.7 | $(NH_4)_2S_2O_8$ | 10.0 | 0.25 | 2.6 | |
| Example 7 | 7.1 | A | 3.7 | $(NH_4)_2S_2O_8$ | 15.0 | 0.26 | 2.5 | |
| Example 8 | 7.1 | A | 5.5 | $(NH_4)_2S_2O_8$ | 10.0 | 0.30 | 2.4 | |
| Example 9 | 7.1 | A | 5.5 | $(NH_4)_2S_2O_8$ | 15.0 | 0.31 | 2.4 | |
| Example 10 | 6.7 | B | 3.3 | $Na_2S_2O_8$ | 15.0 | 0.29 | 2.5 | |
| Example 11 | 7.1 | D | 4.2 | $(NH_4)_2S_2O_8$ | 10.0 | 0.23 | 2.6 | |
| Example 12 | 7.1 | D | 4.2 | $(NH_4)_2S_2O_8$ | 15.0 | 0.25 | 2.5 | |
| Example 13 | 7.1 | D | 6.3 | $(NH_4)_2S_2O_8$ | 10.0 | 0.28 | 2.6 | |
| Example 14 | 7.1 | C | 5.3 | $Na_2S_2O_8$ | 7.0 | 0.21 | 2.6 | |
| Example 15 | 7.1 | C | 6.3 | $Na_2S_2O_8$ | 7.0 | 0.22 | 2.6 | |
| Example 16 | 7.1 | C | 7.3 | $Na_2S_2O_8$ | 5.0 | 0.21 | 2.5 | |
| Example 17 | 7.1 | C | 7.3 | $Na_2S_2O_8$ | 5.7 | 0.21 | 2.5 | |
| Example 18 | 7.1 | C | 8.3 | $Na_2S_2O_8$ | 4.7 | 0.20 | 2.5 | |
| Example 19 | 6.7 | C | 3.7 | $(NH_4)_2S_2O_8$ | 20.0 | 0.25 | 2.6 | |
| Example 20 | 7.1 | C | 4.3 | $(NH_4)_2S_2O_8$ | 10.0 | 0.22 | 2.6 | |
| Example 21 | 7.1 | E | 50.0 | $(NH_4)_2S_2O_8$ | 15.0 | 0.13 | 6.2 | |
| Example 22 | 8.7 | E | 32.0 | $(NH_4)_2S_2O_8$ | 20.0 | 0.15 | 6.6 | |
| Example 23 | 8.7 | E | 48.0 | $(NH_4)_2S_2O_8$ | 30.0 | 0.18 | 6.4 | |
| Example 24 | 7.1 | F | 20.0 | $(NH_4)_2S_2O_8$ | 15.0 | 0.17 | 7.7 | |
| Example 25 | 7.1 | F | 30.0 | $(NH_4)_2S_2O_8$ | 15.0 | 0.17 | 7.6 | |
| Example 26 | 7.1 | F | 20.0 | $Na_2S_2O_8$ | 15.7 | 0.15 | 8.1 | |
| Example 27 | 7.1 | C | 7.3 | $Na_2S_2O_8$ | 5.7 | 0.21 | 2.5 | $Na_2SO_4$ 2.1 |
| Example 28 | 7.1 | C | 7.3 | $Na_2S_2O_8$ | 5.7 | 0.22 | 2.5 | $Na_2SO_4$ 4.3 |
| Example 29 | 7.1 | C | 8.3 | $Na_2S_2O_8$ | 4.7 | | 2.4 | $Na_2SO_4$ 2.1 |
| Comp. Example 1 | 7.1 | A | 3.7 | | | 0.06 | 2.5 | |
| Comp. Example 2 | 10.0 | A | 15.0 | | | 0.15 | 2.2 | |
| Comp. Example 3 | 10.0 | A | | | | 0.25 | 1.8 | |
| Comp. Example 5 | 7.1 | D | 4.2 | | | 0.06 | 2.4 | |
| Comp. Example 6 | 7.1 | C | 4.3 | | | 0.06 | 2.1 | |
| Comp. Example 7 | 8.7 | E | 32.0 | | | 0.11 | 6.8 | |
| Comp. Example 8 | 8.9 | F | 20.0 | | | 0.10 | 8.5 | |
| Comp. Example 9 | 7.1 | | | $(NH_4)_2S_2O_8$ | 10.0 | 0.09 | 8.0 | |
| Comp. Example 10 | 15.0 | A | 15.0 | $H_2O_2$ | 6.0 | 0.14 | 2.0 | |
| Comp. Example 11 | 15.0 | A | 15.0 | $H_2O_2$ | 9.0 | 0.15 | 2.0 | |
| Comp. Example 12 | 10.0 | A | 15.0 | $H_2O_2$ | 30.0 | 0.16 | 2.1 | |
| Comp. Example 13 | 10.0 | A | 15.0 | $H_2O_2$ | 45.0 | 0.16 | 2.0 | |

Iron Salt
A:$Fe(NO_3)_3.9H_2O$ . . . Iron(III) Nitrate.$9H_2O$
B:$Fe(SO_4).7H_2O$ . . . Iron (II) Sulfate.$7H_2O$
C:$NH_4Fe(SO_4)_2.12H_2O$ . . . Ammonium Iron III Sufate.$12H_2O$
D:$Fe(ClO_4)_3.7H_2O$ . . . Iron (III) Perchlorate.$7H_2O$
E:$NH_4Fe(Ci)$ . . . Ammonium Iron (III) Citrate
F:$EDTA.Fe.NH_4.NH_4OH$ . . . chelete complex of EDTA acid Iron Salt A:$Fe(NO_3)_3.9H_2O$ . . . Iron(III) Nitrate.$9H_2O$ B:$Fe(SO_4).7H_2O$ . . . Iron (II) Sulfate.$7H_2O$ C:$NH_4Fe(SO_4)_2.12H_2O$ . . . Ammonium Iron III Sufate.$12H_2O$ D:$Fe(ClO_4)_37H_2O$ . . . Iron (III) Perchlorate.$7H_2O$ E:$NH_4Fe(Ci)$ . . . Ammonium Iron (III) Citrate F:$EDTA.Fe.NH_4.NH_4OH$ . . . Iron chelete complex of EDTA acid From the results shown in Table 1, it is evident that the polishing compositions of the present invention exhibit high polishing performance as compared with a composition containing a conventional iron compound only, a composition containing a peroxydisulfate salt only or a composition having hydrogen peroxide added to an iron compound. Comparative Example 3 shows a composition whereby a high polishing performance is obtained by an addition of an iron compound only, but the pH is as low as less than 2.0, since the amount of iron(III) nitrate as an iron compound is large.

Further, using a contact surface roughness meter, Tencor P12 (manufactured by Tencor instruments Co., U.S.A.), the surface roughness of the substrate was measured. As a result, there was no substantial difference between Examples and Comparative Examples, and it is evident that in both Examples and Comparative Examples, a very smooth surface with a Ra value of less than 4.0 Å was obtained. Further, scratches were visually observed under a spotlight in a dark room, whereby there was no substantial difference in the number of scratches as between Examples and Comparative Examples, and it was found that in both Examples and Comparative Examples, a good surface with little scratches was obtained.

As described in the foregoing, the polishing composition of the present invention has a high stock removal rate and is capable of providing a polished surface having a small surface roughness and capable of preventing formation of microprotrusions, fine pits or other surface defects, and it is further characterized in that it presents a high stock removal rate even at a pH greater than 2.0.

What is claimed is:

1. A polishing composition for a memory hard disk, which comprises the following components (a) to (d):
    (a) from 0.1 to 50 wt %, based on the total amount of the polishing composition, of at least one abrasive selected from the group consisting of silicon dioxide, aluminum oxide, cerium oxide, zirconium oxide, titanium oxide, silicon nitride and manganese dioxide,
    (b) from 0.001 to 10 wt %, based on the total amount of the polishing composition, of at least one iron salt selected from the group consisting of iron nitrate, iron sulfate, ammonium iron sulfate, iron perchlorate, iron chloride, iron citrate, ammonium iron titrate, iron oxalate, ammonium iron oxalate and an iron chelate complex salt of ethylenediaminetetraacetic acid,
    (c) from 0.01 to 30 wt %, based on the total amount of the polishing composition, of at least one peroxydisulfate salt selected from the group consisting of ammonium peroxydisulfate, potassium peroxydisulfate and sodium peroxydisulfate, and
    (d) water.

2. The polishing composition according to claim 1, wherein the abrasive is colloidal silica.

3. The polishing composition according to claim 1, which further contains at least one member selected from the group consisting of potassium sulfate, sodium sulfate and ammonium sulfate, as a buffer component.

4. The polishing composition according to claim 1, which has a pH of at least 2.

5. A method for producing a memory hard disk, which comprises polishing a substrate for a memory hard disk with a polishing composition for a memory hard disk, which comprises the following components (a) to (d):
    (a) from 0.1 to 50 wt %, based on the total amount of the polishing composition, of at least one abrasive selected from the group consisting of silicon dioxide, aluminum oxide, cerium oxide, zirconium oxide, titanium oxide, silicon nitride and manganese dioxide,
    (b) from 0.001 to 10 wt %, based on the total amount of the polishing composition, of at least one iron salt selected from the group consisting of iron nitrate, iron sulfate, ammonium iron sulfate, iron perchlorate, iron chloride, iron citrate, ammonium iron titrate, iron oxalate, ammonium iron oxalate, and an iron chelate complex salt of ethylenediaminetetraacetic acid,
    (c) from 0.01 to 30 wt %, based on the total amount of the polishing composition of at least one peroxydisulfate salt selected from the group consisting of ammonium peroxydisulfate, potassium peroxydisulfate and sodium peroxydisulfate, and
    (d) water.

6. The method according to claim 5, wherein the substrate is a Ni—P disk or an aluminum disk.

7. The method according to claim 5, wherein a Ni—P disk or an aluminum disk preliminarily polished once or a plurality of times, is subjected to polishing with said polishing composition.

8. The method according to claim 6, wherein the Ni—P disk or the aluminum disk prior to polishing has a surface roughness Ra of at most 30 Å.

* * * * *

UNITED STATES PATENT AND TRADEMARK OFFICE
CERTIFICATE OF CORRECTION

PATENT NO. : 6,280,490 B1
DATED : August 28, 2001
INVENTOR(S) : Rader et al.

It is certified that error appears in the above-identified patent and that said Letters Patent is hereby corrected as shown below:

Title page,
Item [57], ABSTRACT, line 27, "titrate", should read -- citrate --.

Column 11,
Line 29, "titrate", should read -- citrate --.

Column 12,
Line 20, "titrate", should read -- citrate --.

Signed and Sealed this

Twenty-third Day of April, 2002

Attest:

*Attesting Officer*

JAMES E. ROGAN
*Director of the United States Patent and Trademark Office*